ns patent office 2,729,253
Patented Jan. 3, 1956

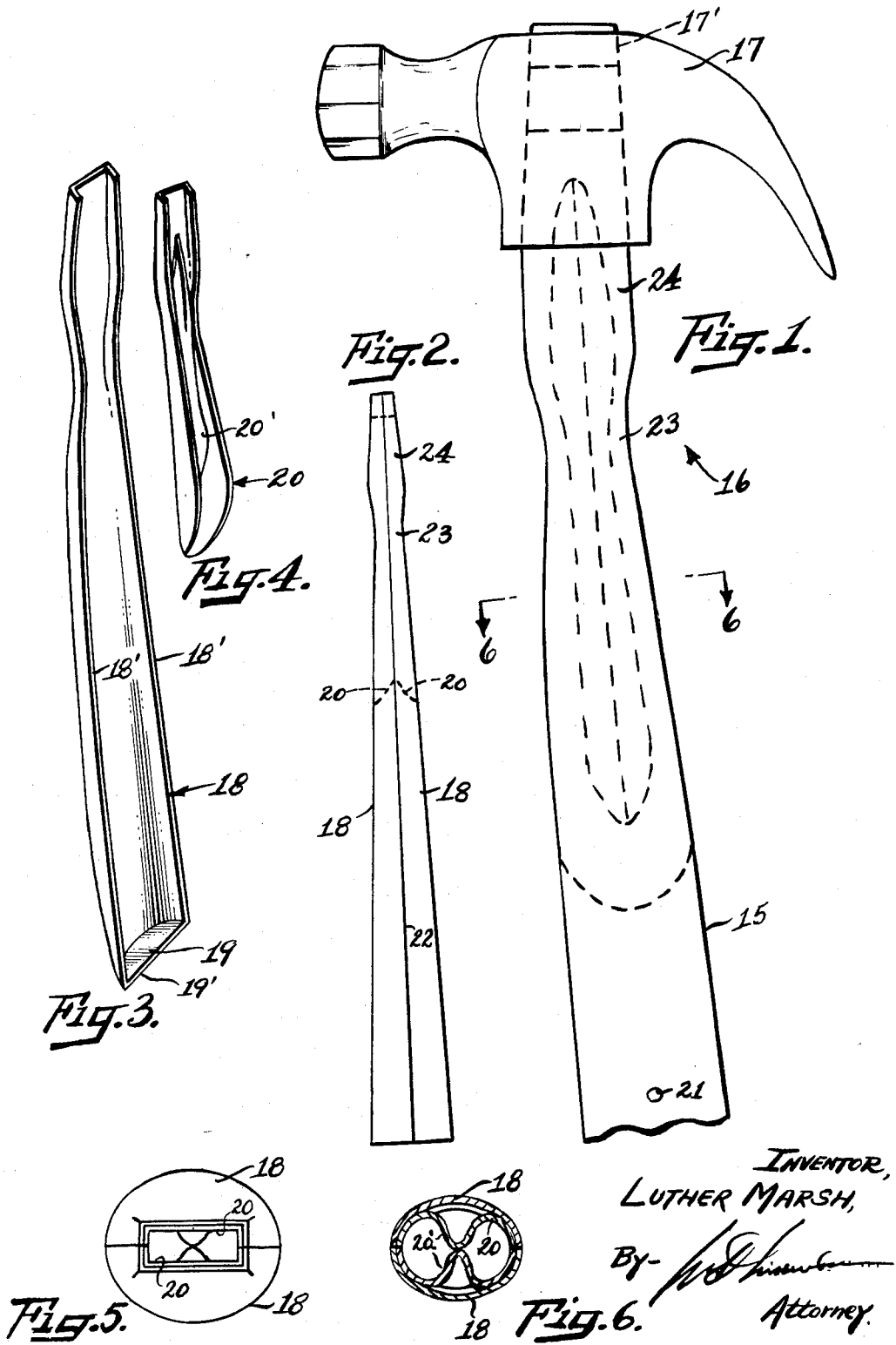

2,729,253

HAMMER WITH TUBULAR HANDLE HAVING REINFORCING MEANS

Luther Marsh, Philadelphia, Pa., assignor, by mesne assignments, to Hardware Products Co., New York, N. Y., a firm Application December 7, 1954, Serial No. 473,535

5 Claims. (Cl. 145—29)

The present invention relates to handles for hammers, hatchets and the like. More particularly, this invention is concerned with handle structures which are hollow and adapted to be made of sheet metal stampings.

An object of this invention is to provide a novel and improved handle of the character mentioned, conforming substantially to empirical shape where the upper portion thereof is slender and though it is this part of the handle which bears the brunt of forces the tool is subjected to in use, it is reinforced in a special manner so that it is of proper strength to withstand forces applied along and angular to the longitudinal plane of the tool head.

Another object hereof is to provide a novel and improved handle construction of the type set forth with reinforcement means which also serves to absorb shock.

A further object of this invention is to provide a novel and improved hollow metal handle of the kind described, which is light in weight, simple and reasonably cheap to manufacture and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a cheek face view of a hammer head on a handle embodying the teachings of this invention.

Fig. 2 is a side view of the handle shown in reduced scale.

Fig. 3 is a perspective view of the metal stamping which constitutes a longitudinal half of said handle.

Fig. 4 is a perspective view showing one of the reinforcement pieces which is of preferred design.

Fig. 5 is a top view of the handle member of Fig. 1.

Fig. 6 is a section taken at lines 6—6 in Fig. 1.

In the preferred embodiment shown in the drawings, the numeral 15 designates generally the handle of a hammer 16 whose head 17 may be of any desired shape. Said handle may be of symmetrical shape and hence is made of a pair of sheet metal stampings 18, each of which is a channel preferably closed by an integral end wall 19, with edges 18', 19' coplanar so that when both parts 18 are assembled to form a hollow handle structure, corresponding edges will be in contact. For assembly, after the reinforcement pieces 20 are inserted to nest respectively along the upper part of the handle 15, parts 18 may be riveted as at 21, or their meeting edges welded, as indicated by the numeral 22. Any roughness along the seam, is of course ground smooth. The reinforcement pieces 20 are also elongated channels which form a tubular structure within the handle and nest respectively in the upper portions of the handle halves 18 so that they lie part way into the eye 17' of the head. Each of these reinforcement pieces 20 are formed to have a longitudinal rib 20' extending thereinto. These ribs preferably are in contact when the handle is assembled. In usual handle design, there is a slender portion 23 near head end, between wider portions; the lower of which is comparatively stout and the upper of which tapers toward top end to receive the head 17; such upper tapering end being denoted by the numeral 24. The reinforcement pieces 20 are correspondingly shaped so that they form a tubular assembly within the handle proper.

Carpenters test a hammer for "balance." They rest it on its claw so that the hammer may rock. If the handle assumes a position near vertical when at rest, the tool is said to be unbalanced. If the handle makes half a right angle with the surface rested on, the hammer is called "balanced." This is mentioned because the handle taught herein lends itself to proper balance by having the reinforcement pieces 20 of proper length to accomplish same.

Said reinforcement members give suitable strength to the handle 15 where it enters the head 17, because said members 20 are part way into such head, and to the slender portion 23. These two regions are where handle strength is most needed. Said members 20 also serve to absorb shock because forces acting on the handle when the tool is in use, tend to act on such pieces as if to pinch them to close and they thus act as sort of blade springs within the handle and minimize shock. This is best realized to exist by omitting the reinforcement pieces, whereupon the user experiences shock which is substantially non-existent when the reinforcement pieces 20 are included in the handle structure. It is also to be noted that when the ribs 20' are made to be in contact as shown in Fig. 6, the handle is substantially reinforced against stresses due to striking the hammer in a direction angular to the central plane of the head 17, such plane extending between the tines of the claw, or as when the cheek of the hammer head is used as the striking surface.

Comparatively thin gage sheet steel is proper for the metal stampings 18 and 20. The resulting handle is light in weight. It may be spot-welded within the hammer eye to the head and a plug may be forcibly inserted to close the upper end of the eye.

It is to be noted that the channel members 20 form a tubular structure within an end section of the handle and nests therein, held against lengthwise movement relative thereto because of the relatively slender section 23. The longer channel members 18 are channel members whether they include the end wall parts 19 or not. If desired, the handle 15 may have any suitable paint finish applied by spraying or otherwise.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. In a tool of the character described, an outer elongated tubular structure including two comparatively long channel members positioned with their corresponding longitudinal edges in abutment respectively, means to hold said channel members so assembled to form a handle, an inner elongated tubular structure including two comparatively short channel members positioned with their corresponding longitudinal edges in abutment respectively; all said channel members being of sheet metal; the inner tubular structure being positioned within an end section of the outer tubular structure and a head of a hammer-like tool having an eye to receive a handle therein; both tubular structures being positioned in part within said eye and the outer tubular member being secured to said head; the inner tubular structure extending out of said eye towards the other end of the handle and fitting snugly the greater part of its length within the outer tubular structure; said outer tubular structure having means holding the inner tubular structure from lengthwise movement therein.

2. The tool as defined in claim 1, wherein each of the inner channel members is within only one of the outer channel members respectively.

3. The tool as defined in claim 1, wherein each of the inner channel members is formed with a lengthwise rib extending into the channel of which it is a part.

4. The tool as defined in claim 1, wherein each of the inner channel members is formed with a rib lengthwise thereof; said ribs extending towards each other and in lengthwise contact with each other.

5. The tool as defined in claim 1, wherein each of the channels is formed so that its intermediate section is slender in comparison to its remainder; such slender sections serving to hold the inner structure against lengthwise movement with respect to the outer structure.

References Cited in the file of this patent

UNITED STATES PATENTS

| 412,277 | Lee | Oct. 3, 1889 |
| 1,089,043 | Burgess | Mar. 3, 1914 |
| 1,158,032 | Eastman | Oct. 26, 1915 |

FOREIGN PATENTS

| 290,678 | Switzerland | Aug. 17, 1953 |